United States Patent
Yanamandra et al.

(10) Patent No.: US 12,363,397 B1
(45) Date of Patent: Jul. 15, 2025

(54) COMPUTER-IMPLEMENTED METHODS FOR MOVIE QUESTION ANSWERING AS A SECOND SCREEN EXPERIENCE USING A LARGE LANGUAGE MACHINE LEARNING MODEL

(71) Applicant: Amazon Technologies, Inc., Seattle, WA (US)

(72) Inventors: Abhishek Yanamandra, Seattle, WA (US); Daniel Stephen ReMine, Seattle, WA (US); Rohith Mysore Vijaya Kumar, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 18/455,524

(22) Filed: Aug. 24, 2023

(51) Int. Cl.
*H04N 21/81* (2011.01)
*G06F 16/783* (2019.01)
*G06F 40/40* (2020.01)

(52) U.S. Cl.
CPC ..... *H04N 21/8133* (2013.01); *G06F 16/7844* (2019.01); *G06F 40/40* (2020.01)

(58) Field of Classification Search
CPC .. H04N 21/8133; G06F 16/7844; G06F 40/40
See application file for complete search history.

(56) References Cited

U.S. PATENT DOCUMENTS

2021/0275928 A1\* 9/2021 Ashoori .................. G06F 16/48

OTHER PUBLICATIONS

Vaswani, Ashish et al., "Attention is All You Need", arXiv:1706.03762v7, Aug. 2, 2023, pp. 1-15.

\* cited by examiner

*Primary Examiner* — Anthony Bantamoi
(74) *Attorney, Agent, or Firm* — NICHOLSON DE VOS WEBSTER & ELLIOTT LLP

(57) ABSTRACT

Techniques for performing a machine learning (ML) cinematic (e.g., movie) question answering are described. According to some examples, a computer-implemented method includes receiving a request from a viewer device at a content delivery service to play a video; sending the video from the content delivery service to the viewer device; receiving, by the content delivery service, a question from the viewer device during playing of the video; generating, by a script context retrieval machine learning model of the content delivery service, a proper subset of a script of the video based on an input of the question; generating, by a cinematic question answering machine learning model of the content delivery service, an answer based on an input of the proper subset of the script of the video; and sending, by the content delivery service, the answer to the viewer device.

20 Claims, 10 Drawing Sheets

COMPUTER-IMPLEMENTED METHODS FOR MOVIE QUESTION ANSWERING AS A SECOND SCREEN EXPERIENCE USING A LARGE LANGUAGE MACHINE LEARNING MODEL

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
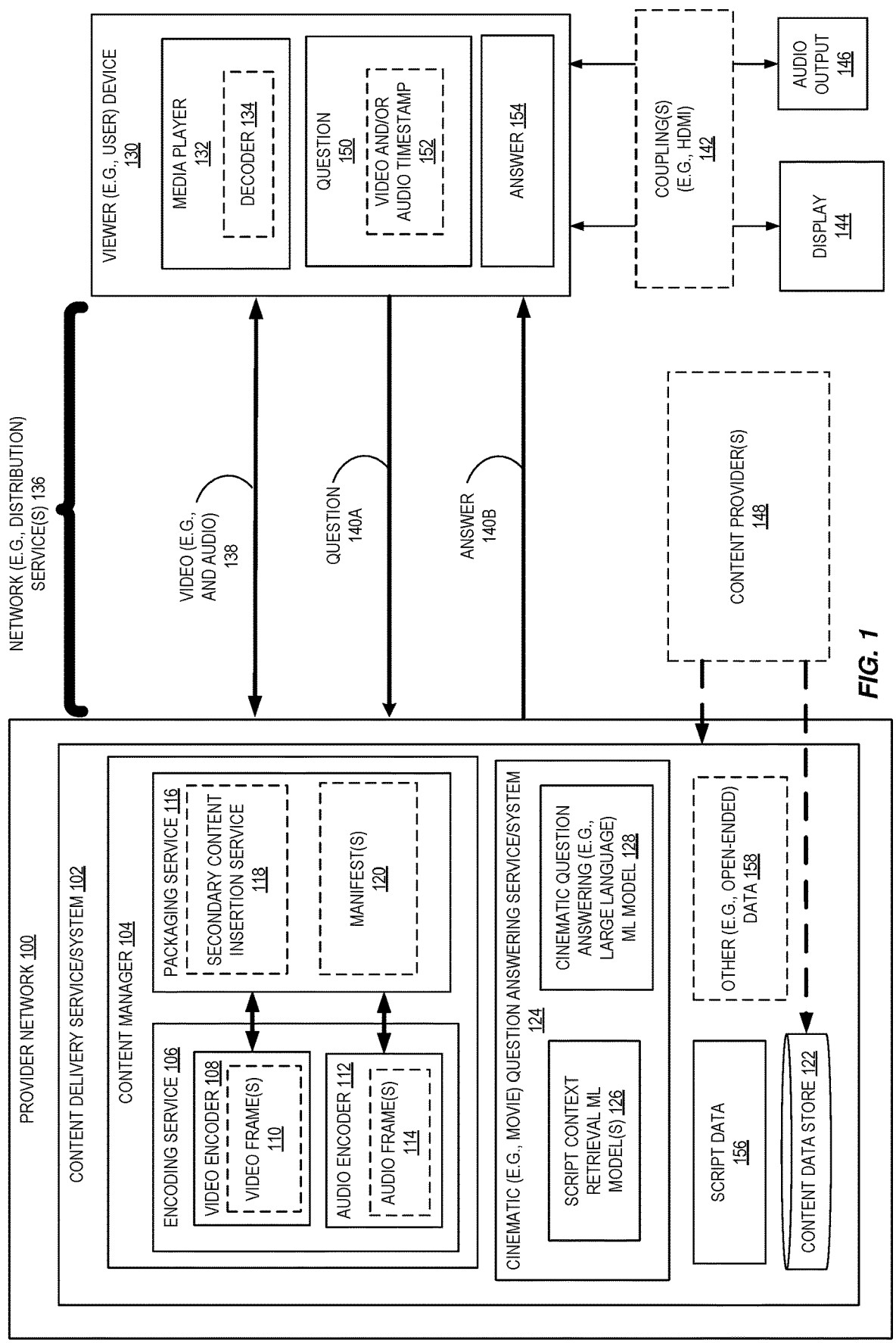
FIG. 1 is a diagram illustrating an environment including a provider network, including a cinematic (e.g., movie) question answering service/system that includes a script context retrieval machine learning (ML) model and a cinematic question answering (e.g., large language) ML model, coupled to a viewer (e.g., user) device according to some examples.

The present disclosure relates to methods, apparatus, systems, and non-transitory computer-readable storage media for performing cinematic (e.g., movie) question answering as a second screen experience using a large language machine learning (ML) model. Certain examples herein are directed to a method of performing cinematic (e.g., movie) question answering with one or more ML models. Certain examples herein are directed to a method of performing cinematic (e.g., movie) question answering with one or more ML models that generate a script context retrieval inference and a cinematic question answering inference based on the script context retrieval inference.

Certain examples herein are directed to one or more ML models (e.g., a large language model (LLM)) that are trained to generate an inferred answer for an input, e.g., an input of a cinematic question. Using such models in a provider network (e.g., content delivery service/system thereof) provides viewers with a unique, interactive experience to engage with better understanding plot and details from earlier in the video or series. In certain examples (e.g., through a language interface (such as, but not limited to, a chat box or voice)), a cinematic (e.g., movie) question answering ML model (e.g., LLM) that generates an inferred answer for a question about the media content (e.g., video), such as, but not limited to, plot points and locations, contextual information, and/or explanation of the content. For example, a viewer may ask the cinematic (e.g., movie) question answering ML model (e.g., via a content delivery service/system implementing that ML model), "Why did the character Walter run towards the danger instead of away from it?" and the cinematic (e.g., movie) question answering ML model could respond, "Because he wanted to save the young girl." This type of response can provide a deeper understanding of the narrative without disrupting the viewer's experience.

In certain examples, the cinematic (e.g., movie) question answering ML model is an LLM that is powered by generative AI (e.g., models that generate new text based on the patterns they have learned from existing text data). In certain examples, the cinematic (e.g., movie) question answering ML model is trained using a combination of supervised and unsupervised learning techniques, for example, capturing and processing large amounts of textual data (e.g., including fan discussions and Q&A forums) related to the content. To ensure accuracy, in certain examples, the training process of the ML model(s) maps questions and answers to specific sections of a script for the media content (e.g., a video), thus reducing the risk of errors.

In certain examples (e.g., during an inference stage), the cinematic (e.g., movie) question answering ML model is deployed to interact with viewers in real time, e.g., providing timestamped references to specific scenes or locations in the content. In certain examples, to prevent spoilers, the provider network (e.g., content delivery service/system thereof) restricts the contextual answers generated by the cinematic (e.g., movie) question answering ML model to a portion of the script only up until the playtime of the viewer's question. This allows viewers to better understand the full story without having to pause or rewind the video. In certain examples, a provider network (e.g., content delivery service/system thereof) utilizes a cinematic (e.g., movie) question answering ML model (e.g., LLM) to provide a unique and interactive viewing experience that is both immersive and informative, enhancing the viewer's understanding and enjoyment of the content, e.g., without spilling any spoilers of the content ahead.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms may mean processing data as it is received as opposed to storing or persisting the data once received for processing later on.

Certain examples herein are directed to an architecture and/or customer facing application that utilizes one or more ML models that generate a script context retrieval inference and a cinematic question answering inference based on the script context retrieval inference.

Example ML Model (e.g., LLM) Architecture:

In certain examples, an ML model (e.g., LLM) functions as a next word predictor based on its understanding of language patterns, grammar, and contextual relationships. In certain examples, an LLM is according to a Transformer architecture, e.g., allowing for parallel computation, attention mechanisms, and the ability to capture long-range dependencies.

Model Training:

In certain examples, preparing a (e.g., untrained or base) ML model (e.g., LLM) for a cinematic (e.g., movie) question answering application includes three stages (e.g., phases): pretraining, finetuning, and task fitting.

Pretraining Stage:

In certain examples, an ML model (e.g., LLM) is initially pretrained on (e.g., large scale) datasets including diverse written text from various sources, such as, but not limited to, books, articles, websites, and more. In certain examples, this pretraining stage helps the ML model (e.g., LLM) develop a broad understanding of language patterns, grammar, and contextual relationships between words. In certain examples, by processing extensive amounts of text, an ML model (e.g., LLM) learns to generate coherent and contextually appropriate responses. In certain examples, after a sufficient volume of processing, it obtains the ability to reason on higher level understandings as well. Example sources for pretraining data are online encyclopedias, books, transcripts, websites, etc. Example LLM architectures are Generative Pre-trained Transformer (GPT), Large Language Model Meta AI (LLaMA), Jurassic-2, etc.

Finetuning Stage:

In certain examples, once pretrained on general purpose data, an ML model (e.g., LLM) for a cinematic (e.g., movie) question answering application is finetuned for the specific use case of cinematic content, e.g., for a content delivery service/system. In certain examples, finetuning an ML model (e.g., LLM) for a cinematic (e.g., movie) question answering application includes training the ML model (e.g., LLM) on domain-specific datasets to adapt it to the unique characteristics and nuances of cinematic storytelling. In certain examples, the finetuning includes masking out part(s) of a script and having the ML model (e.g., LLM) predict the masked-out part(s). Example sources for finetuning data are video (e.g., movie) scripts, video (e.g., movie) captions, reviews, stories, plot summaries, etc.

In certain examples, a script is the written text of a play, movie, or broadcast (e.g., television (TV) shows). In certain examples, the script includes one or more of (e.g., any combination of or excluding): the setting, the characters, the dialogue, and/or the stage directions for movies and TV shows (e.g., and stage plays). In certain examples, when a director stages such productions, they follow the instructions provided by the script. In certain examples, a film script is called a screenplay (e.g., and a TV script is called a teleplay). In certain examples, a script follows an (e.g., industry) standard script format, for example, standard: page margins (e.g., a 1.5-inch margin on the left of the page, a 1-inch margin on the right of the page, and 1 inch of white space on the top and bottom of the page), font (e.g., size twelve Courier font), title page (e.g., the script has a title page with no content apart from the title, author's name, contact information and representation (if applicable)), page numbers (e.g., where page numbers mark every page of the script apart from the first page), character names (e.g., when characters are to speak, their names appear in all capital letters, centered on the page, and indented (e.g., 3.7 inches) from the left side of the page), dialogue (e.g., where lines are centered on the page, below the name of the character speaking, and each dialogue block is indented (e.g., 2.5 inches) from the left side of the page), voiceover (e.g., characters speaking in voiceover are indicated by "v.o." next to their names), "off-screen" or "off-camera" (e.g., characters who can be heard off screen signified as "o.s." (off-screen) in film scripts and "o.c." (off-camera) in tv scripts), dialogue descriptions (e.g., centered in parentheses, and directly above the dialogue), action lines (e.g., descriptions of action are aligned with the left margin of the page, and action lines appear this way and not in parentheticals), proper character introductions (e.g., characters' names are capitalized the first time they appear (e.g., this applies for everyone from the main character to unnamed extras passing through a scene)), scene headings (these also may be called slug lines) (e.g., these are in all caps, aligned left on the page), locations (e.g., scene headings are preceded by "ext." for "exterior" or "int." for "interior"), and/or transitions (e.g., instructions like "fade out" or "blackout") (e.g., appearing in all caps, aligned with the right margin).

Task Fitting Stage (e.g., Task Learning/Fitting on Movie Questions):

In certain examples, once pretrained on general purpose data and finetuned for the specific use case of cinematic content, an ML model (e.g., LLM) for a cinematic (e.g., movie) question answering application is put through a task fitting (e.g., learning) stage that focuses on training the ML model (e.g., LLM) to perform cinematic question answering effectively. In certain examples, the task fitting stage includes teaching the ML model (e.g., LLM) to understand and respond accurately to questions related to plot points, character motivations, locations, and/or other aspects of the cinematic content.

In certain examples, training of one or more ML models to perform a script context retrieval inference and/or a cinematic question answering inference based on the script context retrieval inference utilizes cinematic related data (e.g., questions and/or answers related to the video (e.g., movie)) and/or open-ended data (e.g., questions that do not have an answer located within the video (e.g., script)).

Script Extraction:

In certain examples, a technical problem with performing cinematic (e.g., movie) question answering with an ML model that generates a cinematic question answering inference is that the ML model cannot take as an input an entire (e.g., movie) script (e.g., the ML model cannot perform an inference in real time on an entire script). In certain examples, an ML model (e.g., LLM) can only process a limited amount of text (e.g., about 1000 words), and some entire (e.g., hour plus runtime video) scripts (e.g., movie scripts) are longer than that.

Certain examples herein are directed to the technical solution of utilizing an ML model to extract relevant segment(s) (e.g., one or more (e.g., entire) pages) of a script, for example, as part of a single ML model that generates a cinematic question answering inference, or as a script context retrieval machine learning model and a (separate) cinematic question answering machine learning model. Certain examples herein utilize an ML model (e.g., script context retrieval ML model) to extract searchable information (e.g., a proper subset of a script of the video that the question was asked for) in order to generate an answer to the user's (e.g., customer's) questions, for example, with the extracted information input into a cinematic question answering ML model (along with the question) to generate an inference of an answer.

In certain examples, script retrieval is handled by a search over question embedding similarity. In certain examples, the ML model (e.g., script context retrieval ML model) is a language model that embeds the question as well as each segment of the script, and the top "K" (e.g., where K is selected as an integer greater than zero) similar segments (e.g., pages of the script) will be retrieved. In certain examples, the retrieved pages are one or more pages but less than all of the pages, e.g., less than about 10, 9, 8, 7, 6, 5, 4, 3, or 2 pages (e.g., where a script has about 200 words per page). In certain examples, training and inference will then include these script segments (e.g., pages of the script) as part of the prompt for the ML model (e.g., LLM) which will then use this information while formulating an answer to the question.

In certain examples, a provider network (e.g., content delivery service/system thereof) may receive in-video (e.g., in-movie) questions (e.g., that are answerable using the movie and/or its related data) and open-ended questions (e.g., that are not answerable using the movie and/or its related data).

In-Movie Questions:

In certain examples (e.g., to facilitate in-movie interactions), a provider network (e.g., content delivery service/system thereof) employs supervised and/or unsupervised techniques for script search and extraction. In certain examples, in-movie questions are specific to the content being watched and rely on an accurate mapping between user queries and relevant section(s) of the script. In certain examples, training data for in-movie questions is generated by a supervised technique where the script is annotated with in-movie question and answer pairs (e.g., a known answer to a known question) and/or weakly supervised technique (such as rule-based extraction) of entities mentioned within the movie.

Open-Ended Questions:

For questions which do or may not have explicit answers with the script, in certain examples, a semi-supervised approach is employed to curate training data for in-movie questions, e.g., using LLM embeddings or other similarity metrics to identify a relevant answer from external (e.g., to the script) information.

Sources of Data for Model Training:

In certain examples, there are multiple options for sources of data for model training, for example, by searching (e.g., "scraping") fan webpages, online encyclopedia (e.g., plot summary pages), online forums, social media platforms, etc. These sources can provide a large corpus of textual data, including discussions, theories, and questions related to the content. This data can be preprocessed to extract relevant question-answer pairs.

Additional sources can include official show websites, production notes, interviews, and/or supplementary materials associated with the content. These or subsets of these sources can contribute to a diverse and comprehensive training dataset.

By incorporating both generative capabilities and classification of answer knowledge, certain examples herein enable a ML model (e.g., LLM) to provide informative responses and (e.g., gracefully) indicate when the answer is unavailable.

Incorporating Beyond the Script Information:

In certain examples, to capture other (e.g., open-ended) information about directors, actors, or other aspects beyond the script, an additional data collection and preprocessing step is utilized. In certain examples, this information is obtained from external (e.g., external to the script and/or provider network) sources, such as an industry database (e.g., Internet Movie Database (IMDb)), e.g., and made available to the ML model during inference.

Turning now to the figures, FIG. 1 is a diagram illustrating an environment including a provider network 100, including a cinematic (e.g., movie) question answering service/system 124 that includes a script context retrieval machine learning (ML) model 126 and a cinematic question answering (e.g., large language) ML model 128, coupled to a viewer (e.g., user) device 130 according to some examples.

In certain examples, the provider network 100 (e.g., cloud provider) is coupled to the viewer (e.g., user) device 130 via network (e.g., distribution) service(s) 136. In certain examples, viewer (e.g., user) device 130 is to play one or more video (e.g., and audio) 138 (e.g., feeds), for example, in response to a request from the viewer (e.g., user) device 130.

In certain examples, a question 150 is sent by the viewer device 130 (e.g., input by the viewer thereof) to the provider network 100 for servicing. In certain examples, the question 150 is audio (e.g., and that audio is used by the cinematic (e.g., movie) question answering service/system 124 as an input). In certain examples, the question 150 is entered with voice to text or a textual input (e.g., keyboard). In certain examples, the question includes a timestamp 152, e.g., to avoid generating an answer that utilizes information disclosed after that timestamp in the video 138 that has currently been displayed and/or listened to by the viewer.

In certain examples, the question 150 is sent at 140A from the viewer device 130 to the provider network 100, e.g., to the cinematic (e.g., movie) question answering service/system 124.

In certain examples, the cinematic (e.g., movie) question answering service/system 124 utilizes one or more ML models (e.g., script context retrieval ML model 126 and cinematic question answering ML model 128) that generate a script context retrieval inference and a cinematic question answering inference based on the script context retrieval inference. In certain examples, the provider network 100 (e.g., cinematic (e.g., movie) question answering service/system 124) searches its script data 156 to determine if the script for the video 138 being played by the viewer device 130 is within the script data 156. In certain examples, if no, then the other (e.g., open-ended) data 158 may be utilized to generate an inference of an answer. If certain examples, if yes, then the script 156 for the video 138 and the question 140A are used as inputs into the script context retrieval ML model 126 to generate an inference of a proper subset of the script that is most pertinent to the question (e.g., that may contain the answer). In certain examples, the script context retrieval ML model 126 outputs one or more entire pages as its inference.

In certain examples, the proper subset of the script that is most pertinent to the question generated by the script context retrieval ML model 126 and the question are used as inputs into the cinematic question answering ML model 128 to generate an inference of an answer to that question, e.g., an answer that is based on the proper subset of the script.

Figure 4:
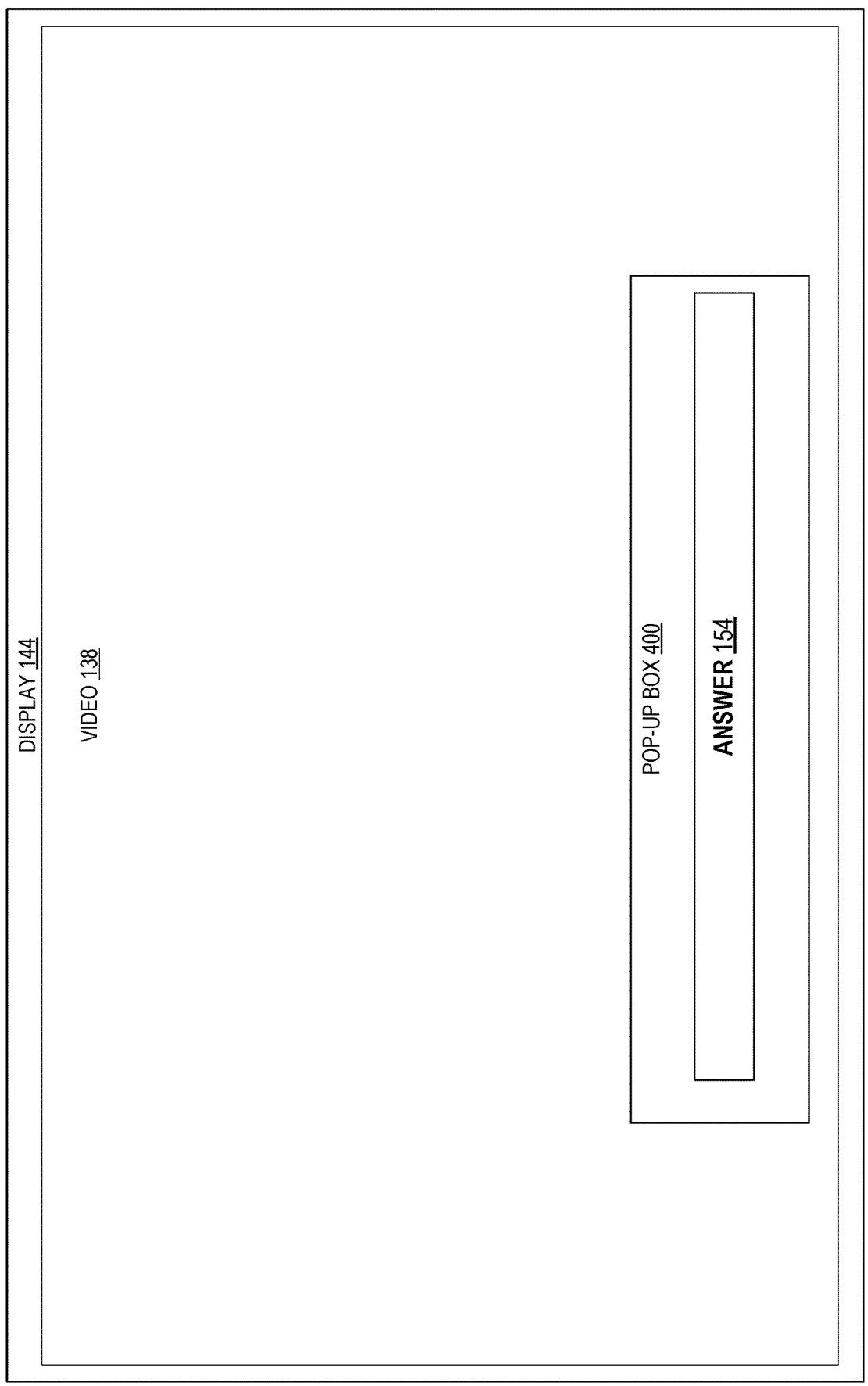
FIG. 4 is a diagram illustrating a display displaying a video and a pop-up box with an answer according to some examples.

In certain examples, the answer 140B is sent from the provider network 100 (e.g., cinematic (e.g., movie) question answering service/system 124) to the viewer device 130, e.g., for outputting as answer 154 by the viewer device 130. In certain examples, the answer 154 is output as an audio answer. In certain examples, the answer 154 is output as a textual answer, e.g., as shown in FIG. 4 (e.g., as a pop-up box overlaid over the video 138).

In certain examples, the question 140A is input text (e.g., a string of words), or a value (e.g., embedding) based on the input text. In certain examples, the question 150 is a query (e.g., textual description) to find an answer.

In one example, while watching "Reacher" Season 1, Episode 1, a viewer asks the question 150 of "what is Jack Reacher's brother's name", with the script context retrieval ML model 126 returning a proper subset of the script that includes the following "Finlay: Jack Reacher. Parents deceased. One brother, Joe, older by two years", and the cinematic question answering ML model 128 returning an answer to viewer device 130 of "Joe".

In certain examples, viewer (e.g., user) device 130 includes a media player 132 to play the video (e.g., and audio) 138. In certain examples, the media player 132 includes a decoder 134 to decode the video for viewing on display 144 and/or audio for outputting on audio output (e.g., speaker) 146. In certain examples, media player device 130 includes a coupling 142 (e.g., according to a standard, such as, but not limited to, a High-Definition Multimedia Interface (HDMI) standard) to display 144 and/or audio output 146. In certain examples, the display 144 and/or audio output 146 (e.g., speaker(s)) are separate from the media player device 130, e.g., a stick media player device. In certain examples, the display 144 and/or audio output 146 (e.g., speaker(s)) are part of the media player device 130, e.g., a smart television device.

In certain examples, media player 132 includes a media player device user identification (ID), e.g., to uniquely identify the user of that media player 132 (e.g., or device 130). In certain examples, a media player 132 allows each user of a plurality of users to have their own media player device user identification (ID).

In certain examples, viewer (e.g., user) device 130 (e.g., media player 132) includes a corresponding graphical user interface (GUI) that is displayed on display 144, e.g., to allow a user to enter a question 150 and/or to allow a user to select content for viewing.

In certain examples, a content provider 148 is to send content to a content data store 122 (e.g., which may be implemented in one or more data centers) and/or content manager 104 (e.g., a single content manager or multiple content managers). In certain examples, a content provider 148 is on site to capture video (e.g., and audio) of a live event. In certain examples, content provider 148 is to encode the resulting output and send that encoded content to one or more downstream entities (e.g., content delivery service/system 102, e.g., via one or more networks).

As one example, a media file (e.g., including a video file and audio file) (e.g., a media container) that is to be encoded is accessed from the content data store 122 by content manager 104. In certain examples, the media file may be uploaded to content data store 122 by content provider(s) 148 or provided directly (e.g., as live content) to content manager 104 by content provider(s) 148 (e.g., from a live content encoder).

In certain examples, the content manager 104 (which may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert the secondary content into the main content.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular viewer device 130 (e.g., based on the client's media player (e.g., determined from its client ID value), display 144 resolution, audio output 146 capabilities, and/or available bandwidth). In certain embodiments, the content is stored in the content delivery service/ system 102 in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 122). In certain embodiments, a viewer device 130 is to read a manifest 120 (e.g., sent in response to manifest request) before the client device may make a request for the media from that manifest, and thus access media files (e.g., video fragments and/or corresponding audio fragments) from content data store 122.

Figure 2:
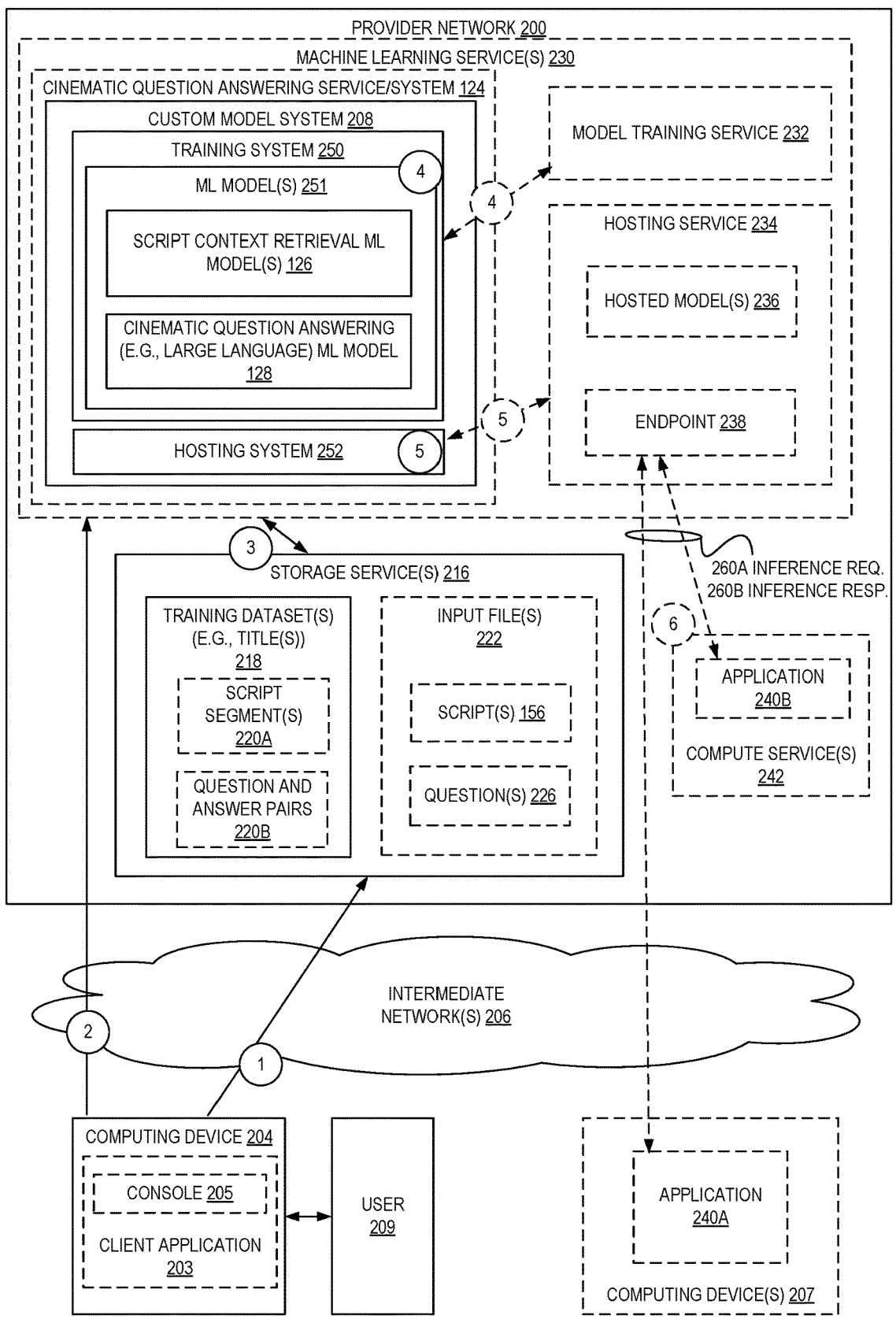
FIG. 2 is a diagram illustrating an environment for creating, training, and using one or more machine learning models according to some examples.

FIG. 2 is a diagram illustrating an environment for creating, training, and using one or more machine learning models according to some examples. FIG. 2 includes a cinematic (e.g., movie) question answering service/system 124, one or more storage services 216, one or more machine learning services 230, and one or more compute services 242 implemented within a multi-tenant provider network 200. Each of a cinematic (e.g., movie) question answering service/system 124, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a pre-initialized runtime environment configured to execute the serverless functions), allowing the serverless functions to be executed in near real-time.

The cinematic (e.g., movie) question answering service/system 124, in some examples, is a machine learning powered service that allows for an inference of an answer to a question for a video (e.g., movie), e.g., the best answer(s) for a question from the script.

The training system 250, for example, may enable users to generate one or more machine learning models 251 (for example, script context retrieval ML model 126 and/or cinematic question answering ML model 128). In certain examples, the ML model(s) 251 (e.g., script context retrieval ML model 126 and/or cinematic question answering ML model 128) outputs a result that indicates an answer (e.g., from script data 156 in FIG. 1) for an inputted question 226 of input 222.

Examples herein allow a customer to create a script context retrieval ML model 126 and/or a cinematic question answering ML model 128 by supplying a training dataset 218 (for example, including script segments 220A and question and answer pairs 220B (e.g., textual strings) (e.g., with the questions and/or answers for these pairs being within a segment of script segments 220A) used for training).

In some examples, the cinematic (e.g., movie) question answering service/system 124—via use of a custom model system 208—allows users to build and use script context retrieval ML model 126 and/or cinematic question answering ML model 128.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into script context retrieval ML model 126 and/or cinematic question answering ML model 128, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify training data 218 (e.g., script segments 220A and/or question and answer pair(s) 220B) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the cinematic (e.g., movie) question answering service/system 124 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 251, this file (or files) may include labels corresponding to the file (e.g., video, audio, and/or text), e.g., with a label indicating category(ies) of content in the file.

Thereafter, at circle (2) the computing device 204 may issue one or more requests (e.g., API calls) to the machine learning service 230 that indicate the user's 209 desire to train one or more algorithms into model(s), e.g., into script context retrieval ML model 126 and/or cinematic question answering ML model 128. The request may be of a type that identifies which type of model(s) are to be created or identifies that the machine learning service 230 itself is to identify the candidate model(s), e.g., candidate script context retrieval ML model 126 and/or candidate cinematic question answering ML model 128. The request may also include one or more of an identifier of a storage location or locations storing the data 218 (e.g., an identifier of the script segments 220A and/or question and answer pair(s) 220B), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the script segments 220A and/or language of the question and answer pair(s) 220B, etc. In some examples, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., the script segments 220A and/or question and answer pair(s) 220B), etc. Thus, the custom model system 208 may retrieve any stored data 218 elements as shown at circle (3), which may be from a storage location within the provider network 200 or external to the provider network 200.

In some examples, the training (at dotted circle (4)) of model(s) 251, includes performing (at optional, dotted circle (4)) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, a shift ratio and/or a shift step) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by cinematic (e.g., movie) question answering service/system 124 to return an answer for a question based at least in part on the inference results (e.g., based on the script segment inference from the script context retrieval ML model 126 and/or answer inference from the cinematic question answering ML model 128 based on an input of the script segment inference).

Figure 3:
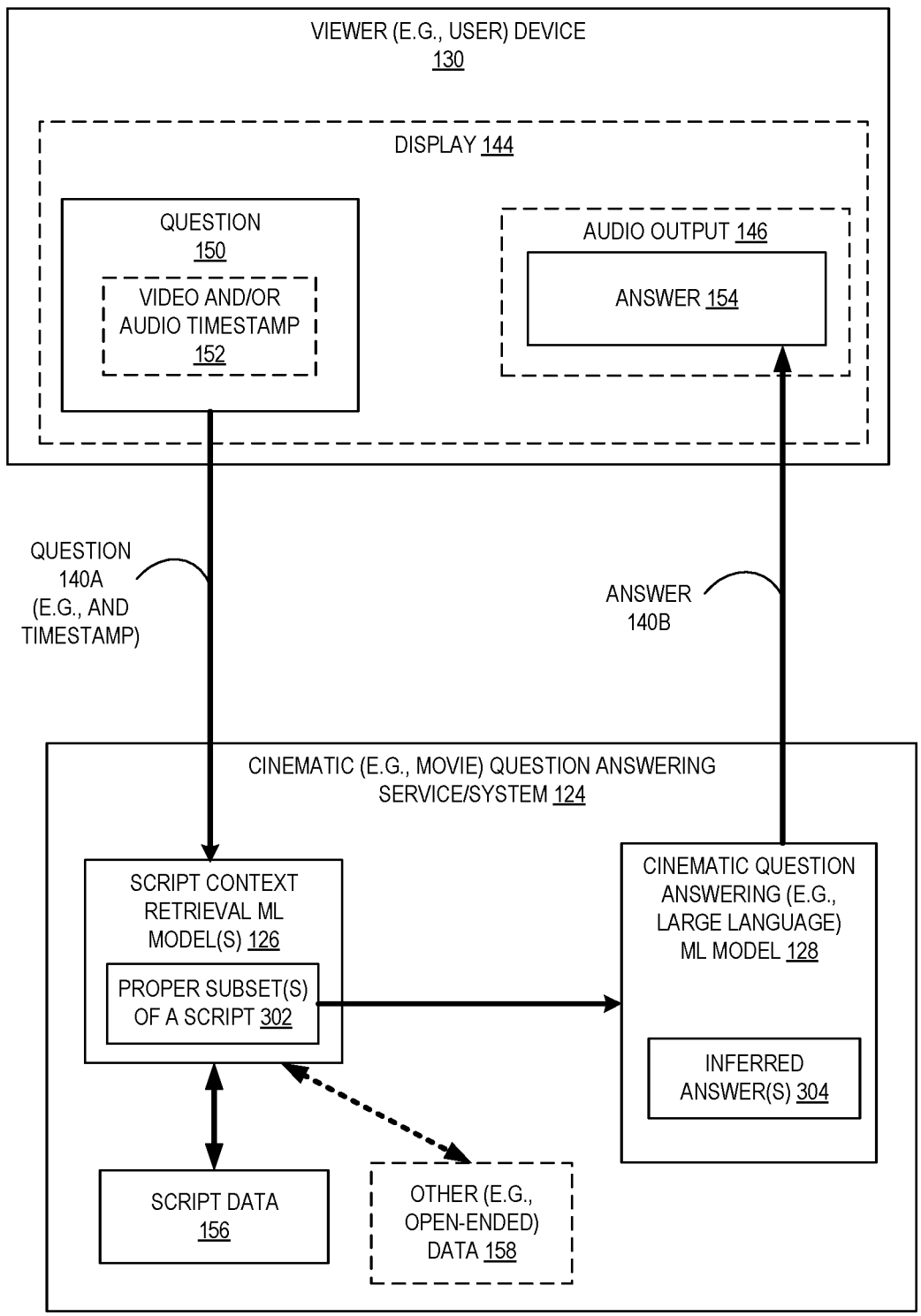
FIG. 3 is a flow diagram illustrating an example flow for a cinematic (e.g., movie) question answering service/system that includes a script context retrieval ML model and a cinematic question answering (e.g., large language) ML model according to some examples.

FIG. 3 is a flow diagram illustrating an example flow for a cinematic (e.g., movie) question answering service/system 124 that includes a script context retrieval ML model 126 and a cinematic question answering (e.g., large language) ML model 128 according to some examples.

In certain examples, the cinematic (e.g., movie) question answering service/system 124 received a question 150 (with an indication of question 150 sent as question 140A) from the viewer device 130 during playing of the video (e.g., on display 144). In certain examples, the cinematic (e.g., movie) question answering service/system 124 generates (e.g., by script context retrieval ML model 126) a proper subset 302 of a script of the video based on an input of the question. In certain examples, the cinematic (e.g., movie) question answering service/system 124 generates (e.g., by cinematic question answering (e.g., large language) ML model 128) one or more inferred answers 304 based on an input of the proper subset 302 of the script of the video. In certain examples, one or more of those inferred answers 304 (e.g., those inferred answers 304 that exceed a confidence threshold) are sent to viewer device 130 as answer 154. In certain examples, the answer is displayed on display 144 and/or output as audio from audio output 146.

In certain examples, the question 150 includes (or is associated with) a timestamp 152 that indicates a portion of the video that has been output (e.g., displayed as video and/or output as audio) by the viewer device 130 when the question was generated during the playing. In certain examples, the generating the proper subset 302 of the script is done so as to select the proper subset of the script to not include any portion of the script beyond the timestamp (e.g., to avoid spoiling any future content of the video).

FIG. 4 is a diagram illustrating a display 144 displaying a video 138 and a pop-up box 400 with an answer 154 according to some examples. In certain examples, the answer 154 is partially transparent (e.g., but visible by the viewer).

Figure 5:
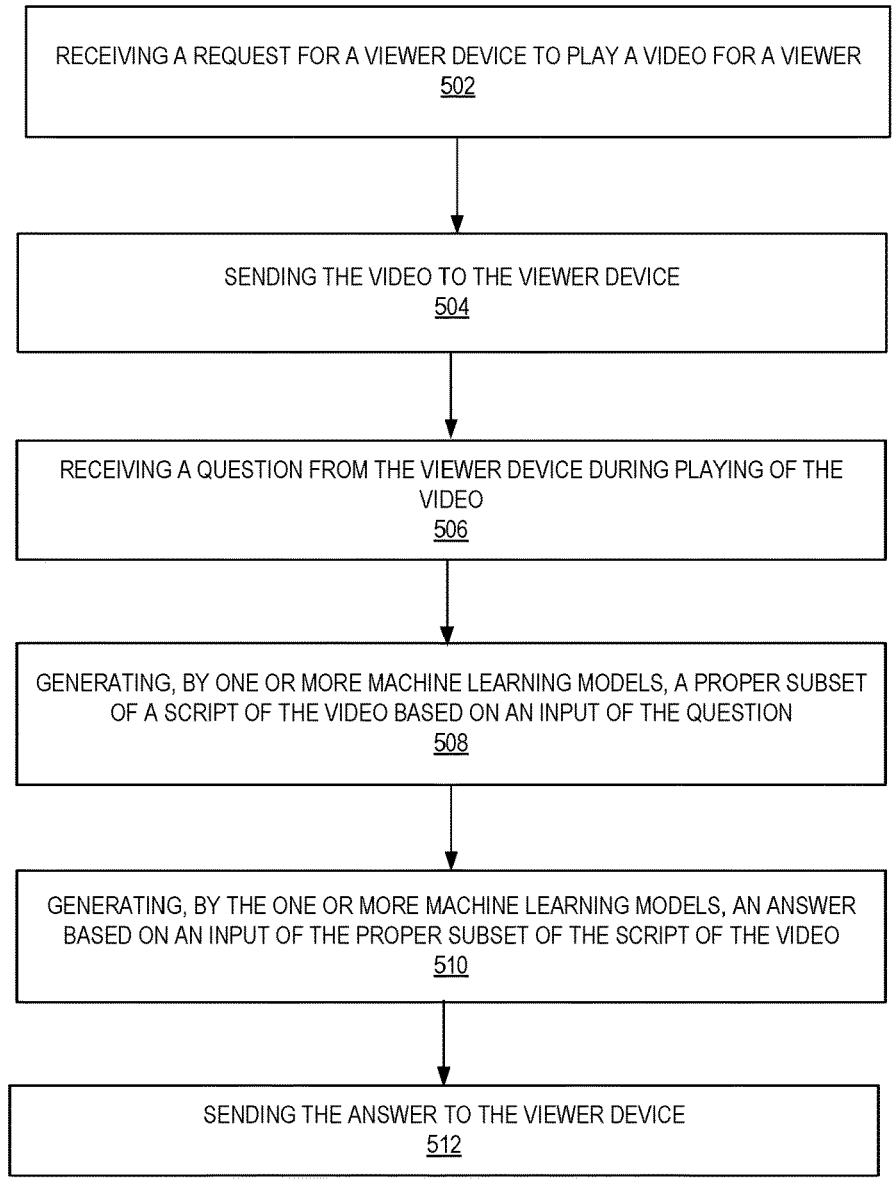
FIG. 5 is a flow diagram illustrating operations of a method of performing a cinematic (e.g., movie) question answering according to some examples.

FIG. 5 is a flow diagram illustrating operations 500 of a method of performing a cinematic (e.g., movie) question answering according to some examples. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 500 are performed by a content delivery service/system 102 (e.g., implemented in a provider network 100) (e.g., cinematic (e.g., movie) question answering service/system 124 thereof) of the other figures.

The operations 500 include, at block 502, receiving a request for a viewer device to play a video for a viewer. The operations 500 further include, at block 504, sending the video to the viewer device. The operations 500 further include, at block 506, receiving a question from the viewer device during playing of the video. The operations 500 further include, at block 508, generating, by one or more machine learning models, a proper subset of a script of the video based on an input of the question. The operations 500 further include, at block 510, generating, by the one or more machine learning models, an answer based on an input of the proper subset of the script of the video. The operations 500 further include, at block 512, sending the answer to the viewer device.

At least some examples of the disclosed technologies can be described in view of the following examples:

Example 1. A computer-implemented method comprising:
  receiving a request from a viewer device at a content delivery service to play a video;
  sending the video from the content delivery service to the viewer device;
  receiving, by the content delivery service, a question from the viewer device during playing of the video;
  generating, by a script context retrieval machine learning model of the content delivery service, a proper subset of a script of the video based on an input of the question;
  generating, by a cinematic question answering (e.g., fine-tuned) machine learning model of the content delivery service, an answer based on an input of the proper subset of the script of the video; and
  sending, by the content delivery service, the answer to the viewer device.

Example 2. The computer-implemented method of example 1, further comprising receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

Example 3. The computer-implemented method of example 1, wherein the sending the answer causes the viewer device to display the answer during the playing of the video.

Example 4. A computer-implemented method comprising:
  receiving a request for a viewer device to play a video for a viewer;
  sending the video to the viewer device;
  receiving a question from the viewer device during playing of the video;
  generating, by one or more machine learning models, a proper subset of a script of the video based on an input of the question;
  generating, by the one or more machine learning models, an answer based on an input of the proper subset of the script of the video; and
  sending the answer to the viewer device.

Example 5. The computer-implemented method of example 4, further comprising receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

Example 6. The computer-implemented method of example 5, wherein the generating the proper subset of the script of the video based on the input of the question and the generating the answer based on the input of the proper subset of the script occur during the playing of the video.

Example 7. The computer-implemented method of example 4, wherein the sending the answer causes the viewer device to display the answer during the playing of the video.

Example 8. The computer-implemented method of example 7, wherein the sending the answer causes the viewer device to display the answer in a pop-up box displayed over the playing of the video.

Example 9. The computer-implemented method of example 4, wherein the one or more machine learning models used to generate the answer based on the input of the proper subset of the script of the video is not able to take the entire script as an input.

Example 10. The computer-implemented method of example 9, wherein the one or more machine learning models used to generate the answer based on the input of the proper subset of the script of the video is a large language model.

Example 11. The computer-implemented method of example 4, wherein the one or more machine learning models used to generate the answer based on the input of the proper subset of the script of the video is a large language model.

Example 12. The computer-implemented method of example 11, further comprising performing a training of the large language model that includes a pretraining stage, a finetuning stage, and a task fitting stage for cinematic question answering.

Example 13. The computer-implemented method of example 4, further comprising performing a training of the one or more machine learning models that includes a mapping of a known question and answer pair to a specific section of a script of a training video.

Example 14. The computer-implemented method of example 4, wherein the proper subset of the script of the video is an entire page granularity.

Example 15. A non-transitory computer-readable medium storing code that, when executed by a device, causes the device to perform a method comprising:
receiving a request for a viewer device to play a video for a viewer;
sending the video to the viewer device;
receiving a question from the viewer during playing of the video;
generating, by one or more machine learning models, a proper subset of a script of the video based on an input of the question;
generating, by the one or more machine learning models, an answer based on an input of the proper subset of the script of the video; and
sending the answer to the viewer device.

Example 16. The non-transitory computer-readable medium of example 15, wherein the method further comprises receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

Example 17. The non-transitory computer-readable medium of example 15, wherein the sending the answer causes the viewer device to display the answer during the playing of the video.

Example 18. The non-transitory computer-readable medium of example 15, wherein the one or more machine learning models used to generate the answer based on the input of the proper subset of the script of the video is a large language model.

Example 19. The non-transitory computer-readable medium of example 15, wherein the method further comprises performing a training of the one or more machine learning models that includes a mapping of a known question and answer pair to a specific section of a script of a training video.

Example 20. The non-transitory computer-readable medium of example 15, wherein the proper subset of the script of the video is an entire page granularity.

Exemplary environments, systems, etc. that the above may be used in are detailed below.

Figure 6:
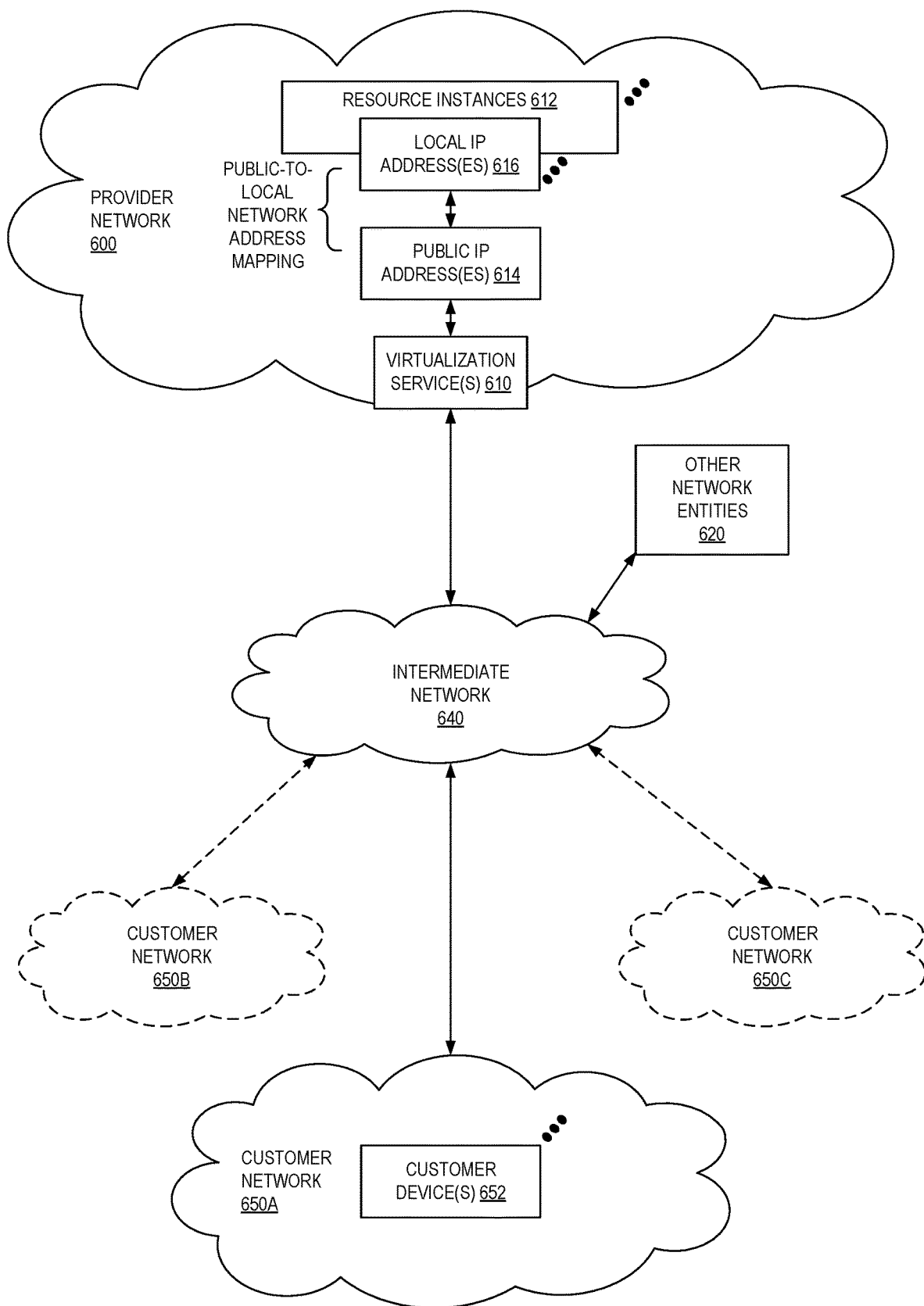
FIG. 6 illustrates an example provider network environment according to some examples.

FIG. 6 illustrates an example provider network (or "service provider system") environment according to some examples. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some examples, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
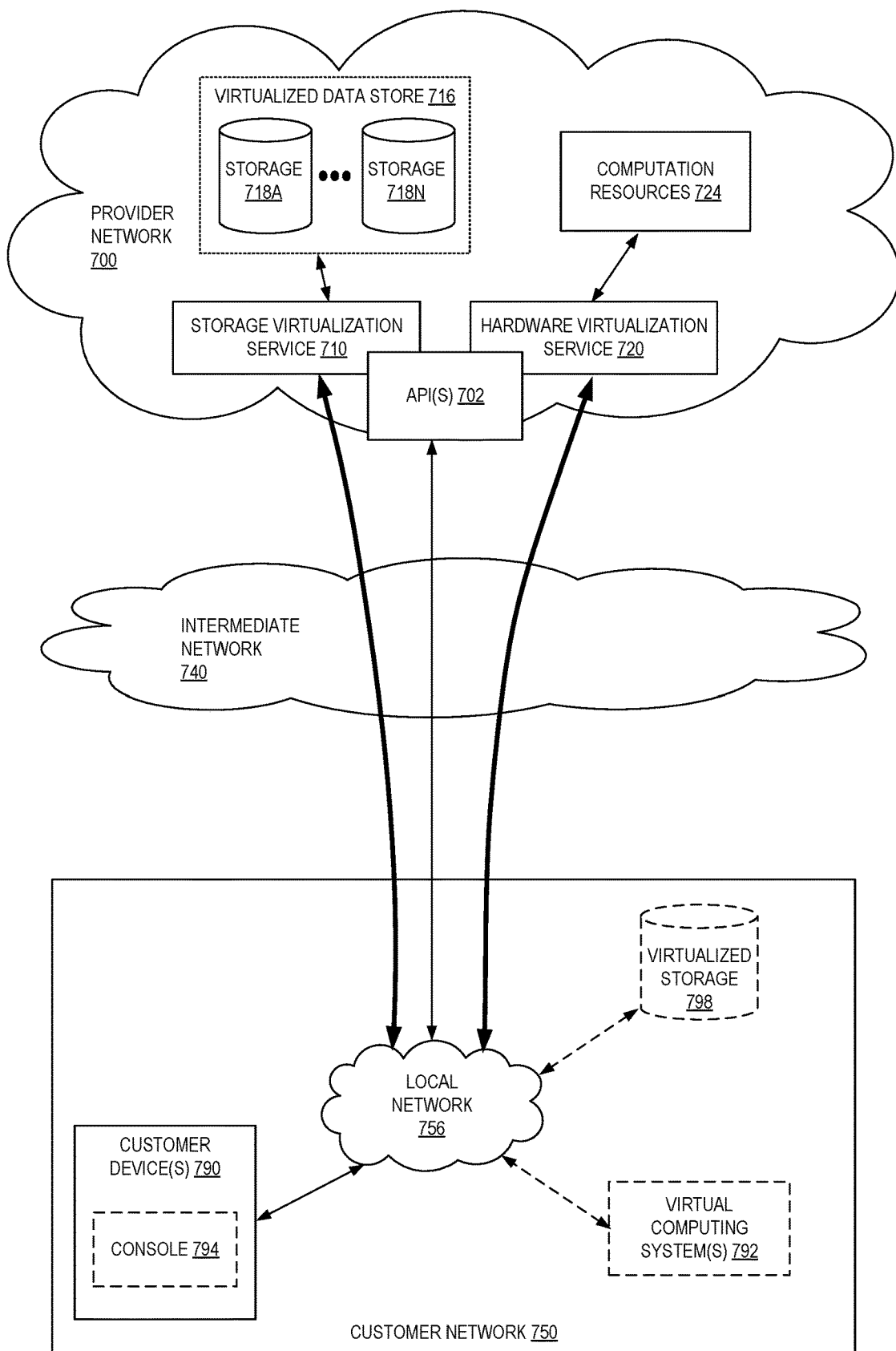
FIG. 7 is a block diagram of an example provider network that provides a storage service and a hardware virtualization service to customers according to some examples.

FIG. 7 is a block diagram of an example provider network that provides a storage service and a hardware virtualization service to customers, according to some examples. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some examples, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some examples, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some examples, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some examples, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
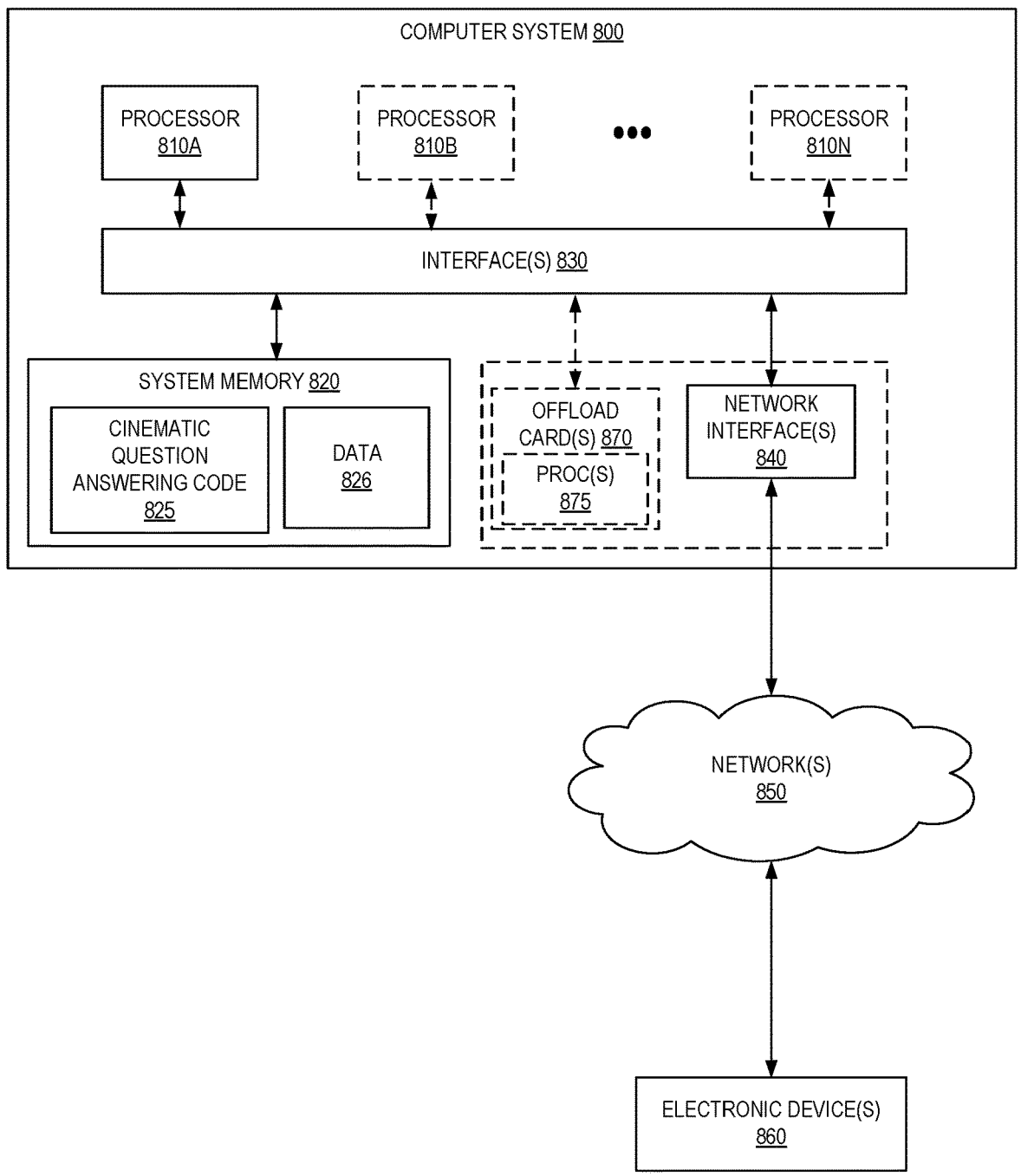
FIG. 8 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 800 illustrated in FIG. 8. In the illustrated example, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various examples a computer system 800 may include one computing device or any number of computing devices configured to work together as a single computer system 800.

In various examples, computer system 800 may be a uniprocessor system including one processor 810, or a multiprocessor system including several processors 810 (e.g., two, four, eight, or another suitable number). Processors 810 may be any suitable processors capable of executing instructions. For example, in various examples, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various examples, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 820 as cinematic question answering code 825 (e.g., executable to implement, in whole or in part, the operations discussed herein) and data 826.

In one example, I/O interface 830 may be configured to coordinate I/O traffic between processor 810, system memory 820, and any peripheral devices in the device, including network interface 840 or other peripheral interfaces. In some examples, I/O interface 830 may perform any necessary protocol, timing, or other data transformations to convert data signals from one component (e.g., system memory 820) into a format suitable for use by another component (e.g., processor 810). In some examples, I/O interface 830 may include support for devices attached through various types of peripheral buses, such as a variant of the Peripheral Component Interconnect (PCI) bus standard or the Universal Serial Bus (USB) standard, for example. In some examples, the function of I/O interface 830 may be split into two or more separate components, such as a north bridge and a south bridge, for example. Also, in some examples some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various examples, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some examples the offload card(s) 870 can perform compute instance management operations such as pausing and/or un-pausing compute instances, launching and/or terminating compute instances, performing memory transfer/copying operations, etc. These management operations may, in some examples, be performed by the offload card(s) 870 in coordination with a hypervisor (e.g., upon a request from a hypervisor) that is executed by the other processors 810A-810N of the computer system 800. However, in some examples the virtualization manager implemented by the offload card(s) 870 can accommodate requests from other entities (e.g., from compute instances themselves), and may not coordinate with (or service) any separate hypervisor.

In some examples, system memory 820 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
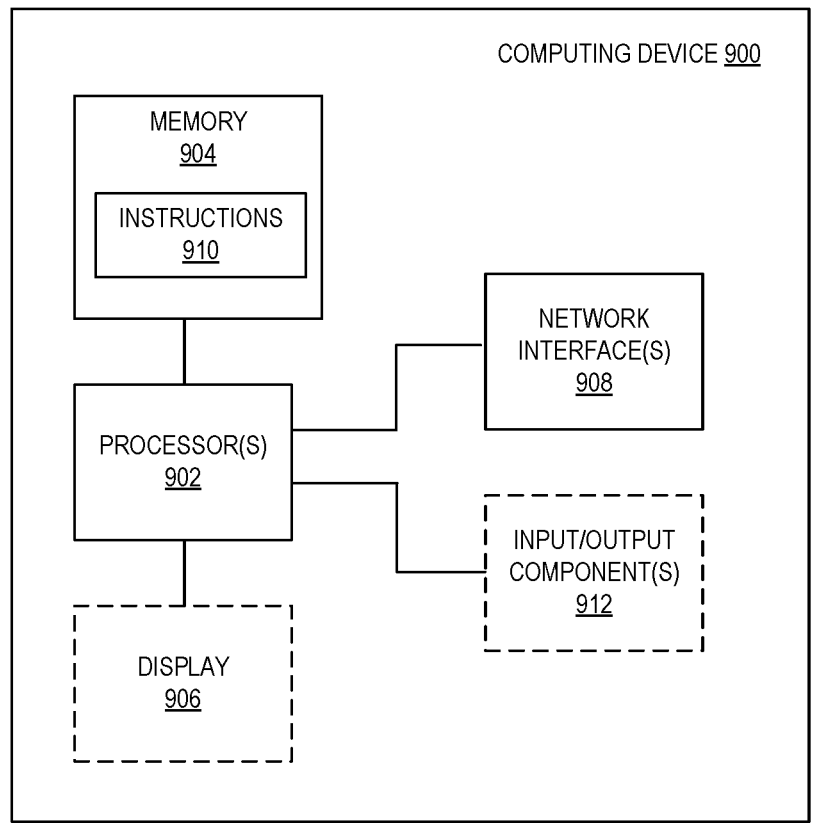
FIG. 9 illustrates a logical arrangement of a set of general components of an exemplary computing device that can be utilized in accordance with various examples.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a content delivery service as disclosed herein), and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various examples may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some examples include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 10:
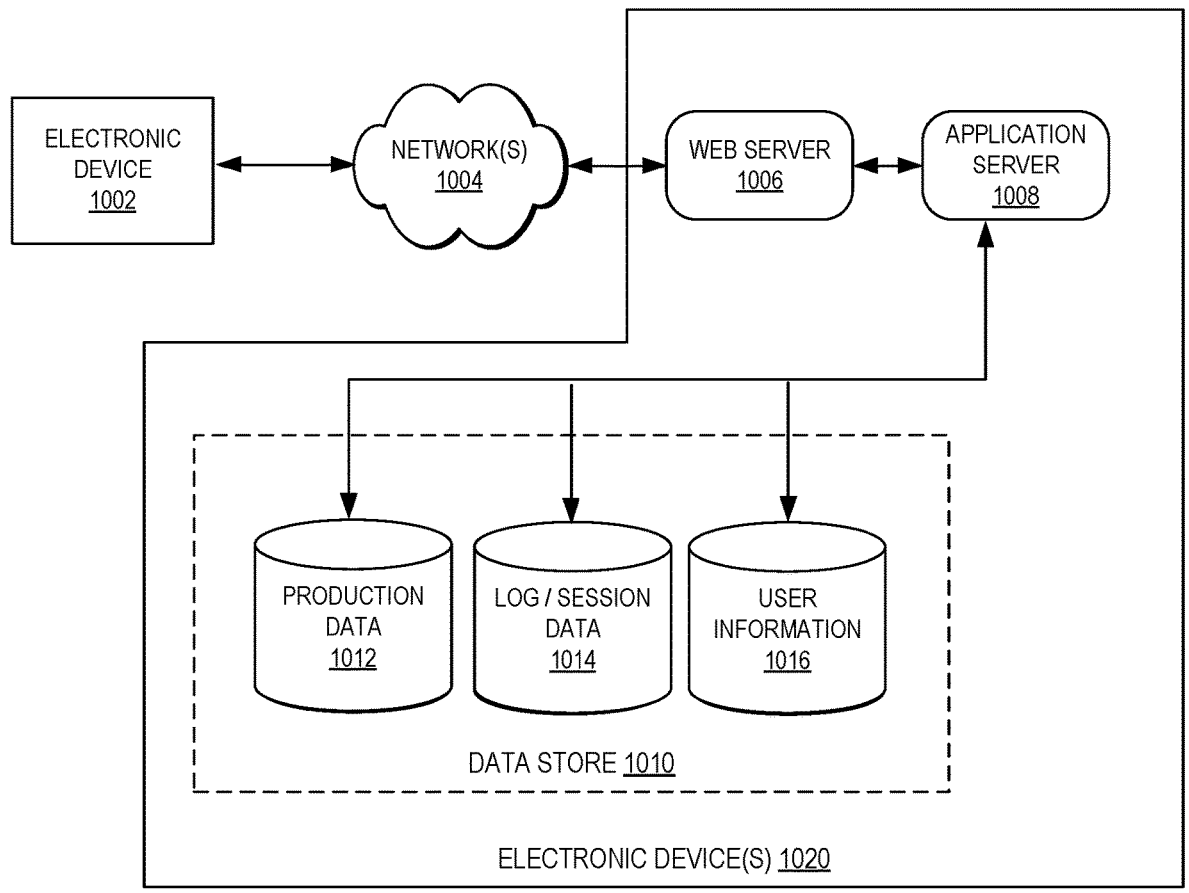
FIG. 10 illustrates an example of an environment for implementing aspects in accordance with various examples.

As discussed, different approaches can be implemented in various environments in accordance with the described examples. For example, FIG. 10 illustrates an example of an environment 1000 for implementing aspects in accordance with various examples. For example, in some examples messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various examples. The system includes an electronic client device 1002, which may also be referred to as a client device and can be any appropriate device operable to send and receive requests, messages, or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 718A-718N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request from a viewer device at a content delivery service to play a video;
   sending the video from the content delivery service to the viewer device;
   receiving, by the content delivery service, a question from the viewer device during playing of the video;
   generating, by a script context retrieval machine learning model of the content delivery service, a proper subset of a script of the video based on an input of the question;
   generating, by a cinematic question answering machine learning model of the content delivery service, an answer based on an input of the proper subset of the script of the video; and
   sending, by the content delivery service, the answer to the viewer device.

2. The computer-implemented method of claim 1, further comprising receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

3. The computer-implemented method of claim 1, wherein the sending the answer causes the viewer device to display the answer during the playing of the video.

4. A computer-implemented method comprising:
   receiving a request for a viewer device to play a video for a viewer;
   sending the video to the viewer device;
   receiving a question from the viewer device during playing of the video;
   generating, by one or more machine learning models, a proper subset of a script of the video based on an input of the question;
   generating, by the one or more machine learning models, an answer based on an input of the proper subset of the script of the video; and
   sending the answer to the viewer device.

5. The computer-implemented method of claim 4, further comprising receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

6. The computer-implemented method of claim 5, wherein the generating the proper subset of the script of the video based on the input of the question and the generating the answer based on the input of the proper subset of the script occur during the playing of the video.

7. The computer-implemented method of claim 4, wherein the sending the answer causes the viewer device to display the answer during the playing of the video.

8. The computer-implemented method of claim 7, wherein the sending the answer causes the viewer device to display the answer in a pop-up box displayed over the playing of the video.

9. The computer-implemented method of claim 4, wherein the one or more machine learning models used to generate the answer based on the input of the proper subset of the script of the video is not able to take the entire script as an input.

10. The computer-implemented method of claim 9, wherein the one or more machine learning models used to generate the answer based on the input of the proper subset of the script of the video is a large language model.

11. The computer-implemented method of claim 4, wherein the one or more machine learning models used to generate the answer based on the input of the proper subset of the script of the video is a large language model.

12. The computer-implemented method of claim 11, further comprising performing a training of the large language model that includes a pretraining stage, a finetuning stage, and a task fitting stage for cinematic question answering.

13. The computer-implemented method of claim 4, further comprising performing a training of the one or more machine learning models that includes a mapping of a known question and answer pair to a specific section of a script of a training video.

14. The computer-implemented method of claim 4, wherein the proper subset of the script of the video is an entire page granularity.

15. A non-transitory computer-readable medium storing code that, when executed by a device, causes the device to perform a method comprising:

receiving a request for a viewer device to play a video for a viewer;

sending the video to the viewer device;

receiving a question from the viewer during playing of the video;

generating, by one or more machine learning models, a proper subset of a script of the video based on an input of the question;

generating, by the one or more machine learning models, an answer based on an input of the proper subset of the script of the video; and sending the answer to the viewer device.

16. The non-transitory computer-readable medium of claim 15, wherein the method further comprises receiving a timestamp from the viewer device that indicates a portion of the video that has been displayed by the viewer device when the question was generated during the playing, wherein the generating the proper subset of the script comprises selecting the proper subset of the script to not include any portion of the script beyond the timestamp.

17. The non-transitory computer-readable medium of claim 15, wherein the sending the answer causes the viewer device to display the answer during the playing of the video.

18. The non-transitory computer-readable medium of claim 15, wherein the one or more machine learning models used to generate the answer based on the input of the proper subset of the script of the video is a large language model.

19. The non-transitory computer-readable medium of claim 15, wherein the method further comprises performing a training of the one or more machine learning models that includes a mapping of a known question and answer pair to a specific section of a script of a training video.

20. The non-transitory computer-readable medium of claim 15, wherein the proper subset of the script of the video is an entire page granularity.

* * * * *